United States Patent
Meyer et al.

(10) Patent No.: US 9,912,611 B2
(45) Date of Patent: Mar. 6, 2018

(54) ROUTER FABRIC

(71) Applicant: GVBB HOLDINGS S.A.R.L., Luxembourg (LU)

(72) Inventors: Charles S. Meyer, Nevada City, CA (US); Ken Buttle, Folsom, CA (US)

(73) Assignee: GVBB HOLDINGS S.A.R.L., Luxembourg (LU)

( * ) Notice: Subject to any disclaimer, the term of this patent is extended or adjusted under 35 U.S.C. 154(b) by 133 days.

(21) Appl. No.: 14/850,895

(22) Filed: Sep. 10, 2015

(65) Prior Publication Data

US 2016/0080288 A1 Mar. 17, 2016

Related U.S. Application Data

(60) Provisional application No. 62/049,268, filed on Sep. 11, 2014.

(51) Int. Cl.
| | | |
|---|---|---|
| *H04L 12/933* | (2013.01) | |
| *H04L 12/721* | (2013.01) | |
| *H04L 12/947* | (2013.01) | |
| *H04N 5/262* | (2006.01) | |
| *H04L 12/931* | (2013.01) | |

(52) U.S. Cl.
CPC ............ *H04L 49/101* (2013.01); *H04L 45/66* (2013.01); *H04L 49/102* (2013.01); *H04L 49/206* (2013.01); *H04L 49/25* (2013.01); *H04L 49/35* (2013.01); *H04N 5/262* (2013.01)

(58) Field of Classification Search
CPC ... H04L 49/101; H04L 49/102; H04L 49/206; H04L 49/25; H04L 45/66
See application file for complete search history.

(56) References Cited

U.S. PATENT DOCUMENTS

| | | | | |
|---|---|---|---|---|
| 5,543,861 A * | 8/1996 | Harradine | ............... | H04N 5/937 345/547 |
| 6,308,046 B1 * | 10/2001 | Jeong | ..................... | H04W 24/00 455/404.1 |
| 6,765,872 B1 * | 7/2004 | Tazaki | ................. | H04L 12/5695 370/235 |
| 7,242,686 B1 * | 7/2007 | Dougherty | .......... | H04L 12/5601 370/395.4 |
| 2003/0118132 A1 * | 6/2003 | Williams | ............... | H04L 7/0054 375/343 |

(Continued)

OTHER PUBLICATIONS

International Search Report and Written Opinion dated Dec. 4, 2015, regarding PCT/EP2015/070897.

(Continued)

*Primary Examiner* — Albert T Chou
(74) *Attorney, Agent, or Firm* — Arent Fox LLP

(57) ABSTRACT

A router fabric for switching real time broadcast video signals in a media processing network includes a logic device configured to route multiple channels of packetized video signals to another network device, a crossbar switch configured to be coupled to a plurality of input/output components and to switch video data of the multiple channels between the logic device and the plurality of input/output components in response to a control instruction, and a controller configured to map routing addresses for each video signal relative to the system clock, and to send the control instruction with the mapping to the crossbar switch and the logic device.

39 Claims, 7 Drawing Sheets

(56) References Cited

U.S. PATENT DOCUMENTS

2011/0176542 A1\* 7/2011 Biswas ................ H04L 12/413
370/389
2015/0281746 A1\* 10/2015 Lam ................... H04N 21/2368
725/116

OTHER PUBLICATIONS

Matthias Laabs: "SDI OVER IP—seamless signal switching in SMPTE Jun. 2022 and a novel multicast routing concept", Nov. 28, 2012 (Nov. 28, 2012), XP055131406, Retrieved from the Internet: URL:https://tech.ebu.ch/docs/techreview/trev 2012-Q4 SDI-over-IP Laabs.pdf [retrieved on Jul. 24, 2014], the whole document.
McKeown N et al: "Tiny Tera: A Packet Switch Core", IEEE Micro, IEEE Service Center, Los Alamitos, CA, US, vol. 17, No. 1, Jan. 1, 1997 (Jan. 1, 1997), pp. 26-33, XP000642693, ISSN: 0272-1732, DOI: 10.1109/40.566194, the whole document.
Goossens K et al: "Internet-Router Buffered Crossbars Based on Networks on Chip", Digital System Design, Architectures, Methods and Tools, 2009. DSD '09. 12th Euromicro Conference on, IEEE, Piscataway, NJ, USA, Aug. 27, 2009 (Aug. 27, 2009), pp. 365-374, XP031578187, ISBN: 978-0-7695-3782-5, the whole document.

\* cited by examiner

ROUTER FABRIC

CLAIM OF PRIORITY UNDER 35 U.S.C. § 119

The present application for patent claims the benefit of Provisional Application No. 62/049,268, filed Sep. 11, 2014, which is assigned to the assignee hereof and hereby expressly incorporated in its entirety by reference herein.

BACKGROUND

Television broadcasting of today involves switching channel feeds from among many available video feeds, each of which may be carried to the broadcasting facility using a variety of signal formats. Source material for live broadcast is typically captured from multiple cameras, video servers, pre-produced material and graphics, assembled and then broadcast directly from a control room or stored for broadcast at a later date.

The legacy video signals, such as serial data interface (SDI) signals, are groomed, predictable and easily provisioned for routing and switching. Other forms of video signals are becoming more popular, such as internet protocol (IP), as media transfer over IP interconnections and using cloud sourcing is now ubiquitous. The downside of bringing in IP signals as video feeds is the asynchronous, bursty, and jittery behavior of such data. Routing and switching of IP signals in a broadcasting environment, particularly for real time broadcasting is a challenge since there is no predictable blanking period to make the switch, which risks a visible glitch on the broadcast at the moment of switching. Existing IP routers are incapable of tracking any regular time signature for packetized data and therefore routing and switching centers must resort to converting the IP video signals to baseband signals, like SDI video, for glitch free switching.

SUMMARY

In an aspect of the disclosure, a router fabric for switching real time broadcast video signals in a media processing network is provided, and includes a logic device configured to route multiple channels of packetized video signals to another network device. The router fabric includes a crossbar switch configured to be coupled to a plurality of input/output components and to switch video data of the multiple channels between the logic device and the plurality of input/output components in response to a control instruction. The router fabric includes a controller configured to dynamically map routing addresses for each video signal relative to a system clock, and to send the control instruction with the mapping to the crossbar switch and the logic device.

In another aspect of the disclosure, a media processing node includes a router fabric and a gateway configured to receive IP packetized video data and determine whether the data packets are vertically aligned with time frames of the system clock. On a condition that the data packets are vertically aligned, the gateway may be configured to pass the packetized data to the crossbar switch for switching and routing within the fabric in an unaltered IP format.

In another aspect of the disclosure, a media processing node includes a router fabric and a video input/output component configured to receive serial data video signals from video sources for input to the fabric router and to send output serial data video signals from the fabric router. The output may be received from the router fabric as over-sampled data packets and the video input/output component may be configured to reduce the sample rate to a data rate equal to the real time broadcast.

In another aspect of the disclosure, a router fabric switches between and amongst media streams which may be baseband video (e.g., L1 serial digital interface (SDI) video) or packetized digital video (e.g., L2, L3), or packetized compressed digital video, cleanly (e.g., without glitch) on a single common timing structure.

In another aspect of the disclosure, a media processing network includes the media processing node and a media distribution node having a router fabric extension. The router fabric extension includes a second logic device configured to communicate with the router fabric and to deliver isochronous packetized video signals to a plurality of media processing nodes logic device. The router fabric extension includes a crossbar switch configured to be coupled to a plurality of input/output components and to switch video data of the multiple channels between the logic device and the plurality of input/output components in response to a control instruction. The router fabric extension also includes a controller configured to map routing addresses for each video signal relative to the system clock, and to send the control instruction with the mapping to the crossbar switch and the second logic device.

In another aspect of the disclosure, a method for switching real time broadcast video signals in a media processing network includes receiving isochronous packetized video signals from a plurality of gateways and input/output components, sending a control instruction with routing map addresses for each video signal relative to a system clock, switching the video signals in response to the control instruction, and multiplexing the switched signals onto multiple channels and routing the channels to another network device in response to the control instruction.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Certain aspects of video production systems will now be presented with reference to various apparatus and methods. These apparatus and methods will be described in the following detailed description and illustrated in the accompanying drawing by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Figure 1:
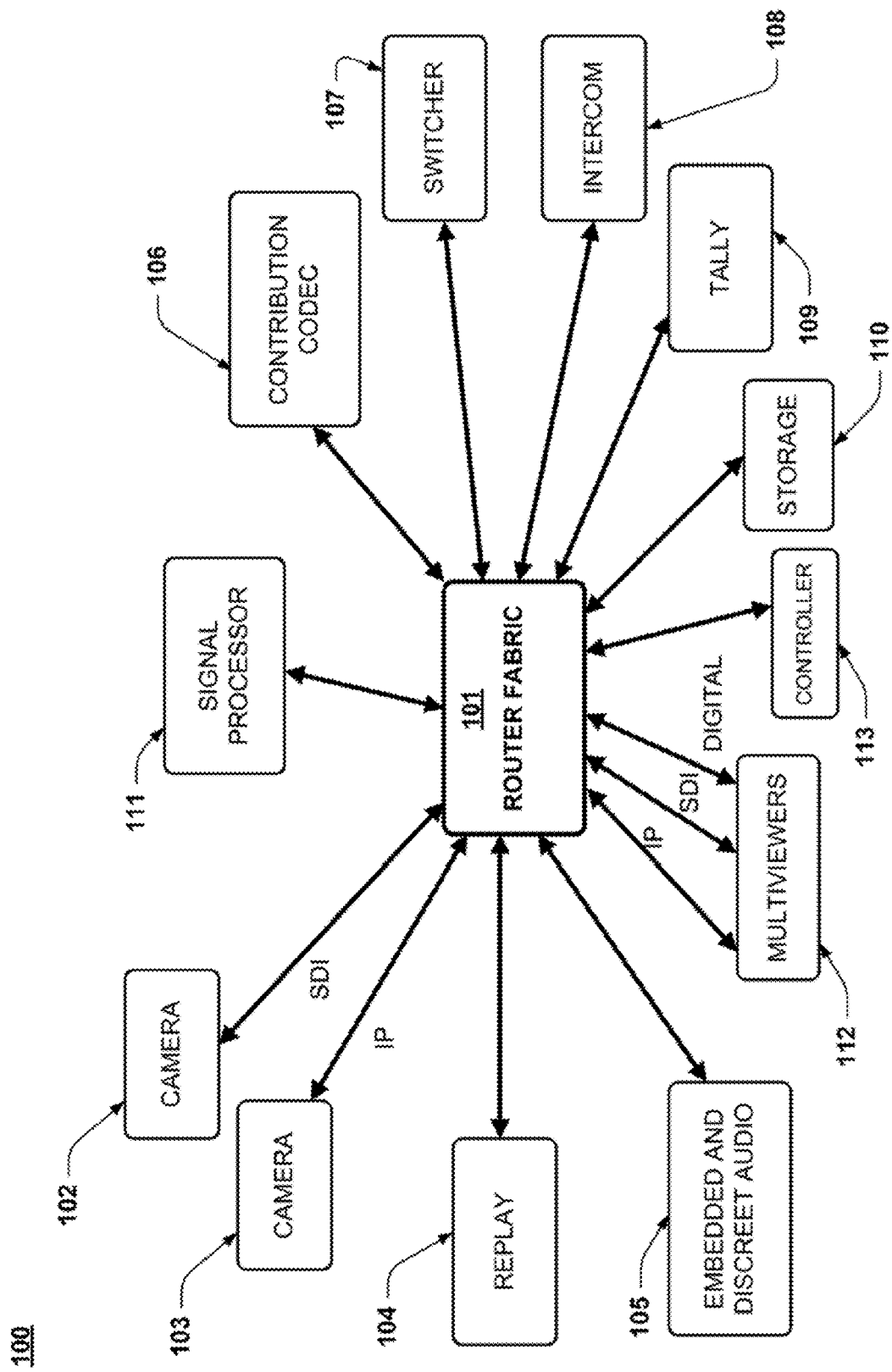
FIG. 1 shows an example media network having a router fabric capable of switching a combination of various packetized data formats.

FIG. 1 shows an example media processing network 100 used for real time broadcasting of video. A router fabric 101 may receive video and audio signals of various formats, including but not limited to serial digital interface (SDI) and internet protocol (IP). A controller 113 may be used to provide operator instructions to the router fabric 101, such as directing a particular video feed to a multiviewer for previewing or to queue a video for sending out on the broadcast. The router fabric 101 may provide control commands over the respective SDI and IP network segments. Various examples of video signal sources and destinations are shown in FIG. 1.

Cameras 102 and 103 collect images and feed back to the router fabric 101 for recording and storage 110, which may be hard disk drives, flash memory or other suitable memory device for local storage. In this example, camera 102 may record video and feed the video signal in SDI format. Camera 103 is shown as an IP device, so the video feed to the router fabric 101 may use IP over an Ethernet connection.

Replay unit 104 replays recorded video without jitter at slow motion speed and sends this video feed to the router fabric 101 on demand by a control instruction from the controller 113 and through the router fabric 101.

Embedded and discreet audio unit 105 may be used for audio production during work flow of the media broadcast in conjunction with the router fabric 101.

Contribution codec 106 controls the compression of the video signals sent out of the network and decompression of the video signals received from the network in conjunction with routing and switching coordinated by the router fabric 101.

Switcher 107 processes software generated video graphic effects, applying a layering of the effects by mix effect engines, which may appear during video switch transitions. One example is the key and fill technique, which is a nonlinear process performed in a stacking order. The switcher 107 assigns the source engines for the effects. The effects may be kept in storage 110 and may be retrieved by the switcher 107 via the router fabric 101.

Intercom 108 processes audio conferencing among camera operators for coordinating technical directing of camera recording. The router fabric 101 may coordinate and integrate the conferencing for the network 100.

Tally 109 is an indicator used as a trigger for production personnel, hardware and software to initiate tasks or operations in response to a state change for example. The router fabric 101 may track and coordinate tally signals across the network 100 over IP.

Signal processor 111 performs various corrections to the video signals, including but not limited to color correction and gamma correction, as instructed by controller 113 through the router fabric 101.

Multiviewers 112 are display screens in the broadcast control center which present the various feeds from video sources, such as cameras 102, 103, replay 104 and switcher 107. In this example of a network device, the network segments are expanded to show example video transmit formats that may applied, including IP, SDI, or some other form of digital transmit signal. While video display on the multiviewers 112 is provided as an example of transmit format variety, it should be noted that any of the various feeds to and from the router fabric 101 may also include separate feeds for different transmit formats where practical.

Figure 2:
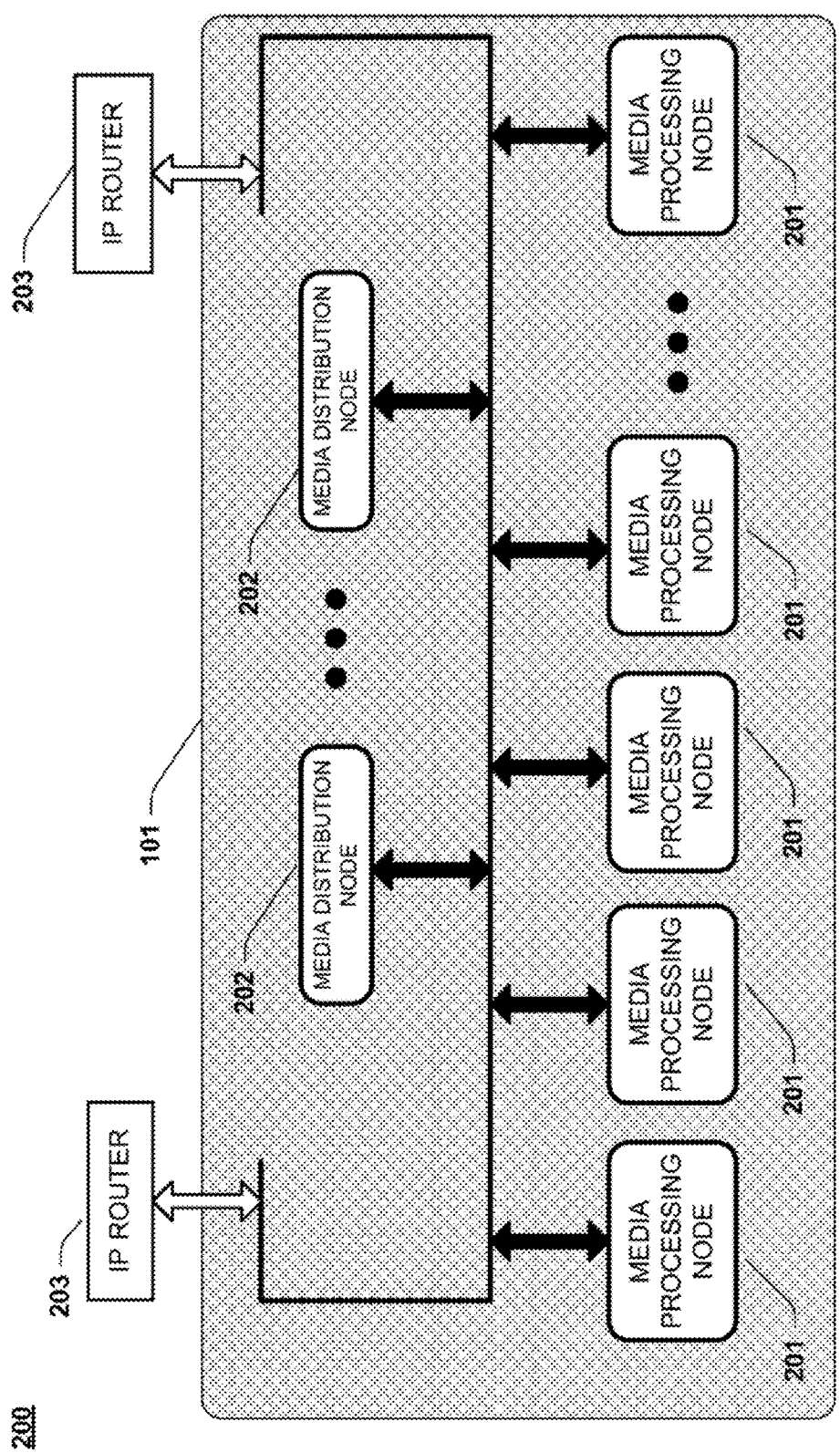
FIG. 2 shows an example configuration of media processing nodes and media distribution nodes using the router fabric.

FIG. 2 shows an example implementation of the router fabric 101 in a modular network 200 having a lower layer of media processing nodes 201 with trunk connections to media distribution nodes 202 and IP routers 203. In this example, the router fabric 101 is distributed across the media processing nodes 201 and media distribution nodes 202, which are interconnected by trunks. This configuration between the media processing nodes 201 and the media distribution nodes 202 permits the network 200 to have less than a one-on-one mesh capacity if desired. The network 200 may be customized to the needs and requirements of the media distribution. For example, for media broadcasting requiring a non-blocking performance, wherein each network pair will have an available path at all times, regardless of current traffic loading, a one-on-one mesh may be configured by connecting a number of media distribution nodes 202 up to the available number of trunks in each media processing node 201. For example, if each media processing node 201 has 12 trunks available, then up to 12 distribution nodes 202 can be connected to the network 200, so that each media processing node 201 has a dedicated trunk to each media distribution node 202. If blocking is permitted for the type of media distribution, then a one-on-one mesh is not needed, and the network can be reduced in size either by reducing the number of trunks, or the number of nodes. The number of IP routers 203 is configurable by preference according to the type of quality of signal distribution. For instance, the router fabric controlled environment and the high quality of signal processing may not be required for a particular set of channel traffic, and the IP domain may be adequate for the particular media. A number of IP routers 203 may then be selected for connection to the router fabric 101 to carry the expected routed traffic to an IP core.

Figure 3:
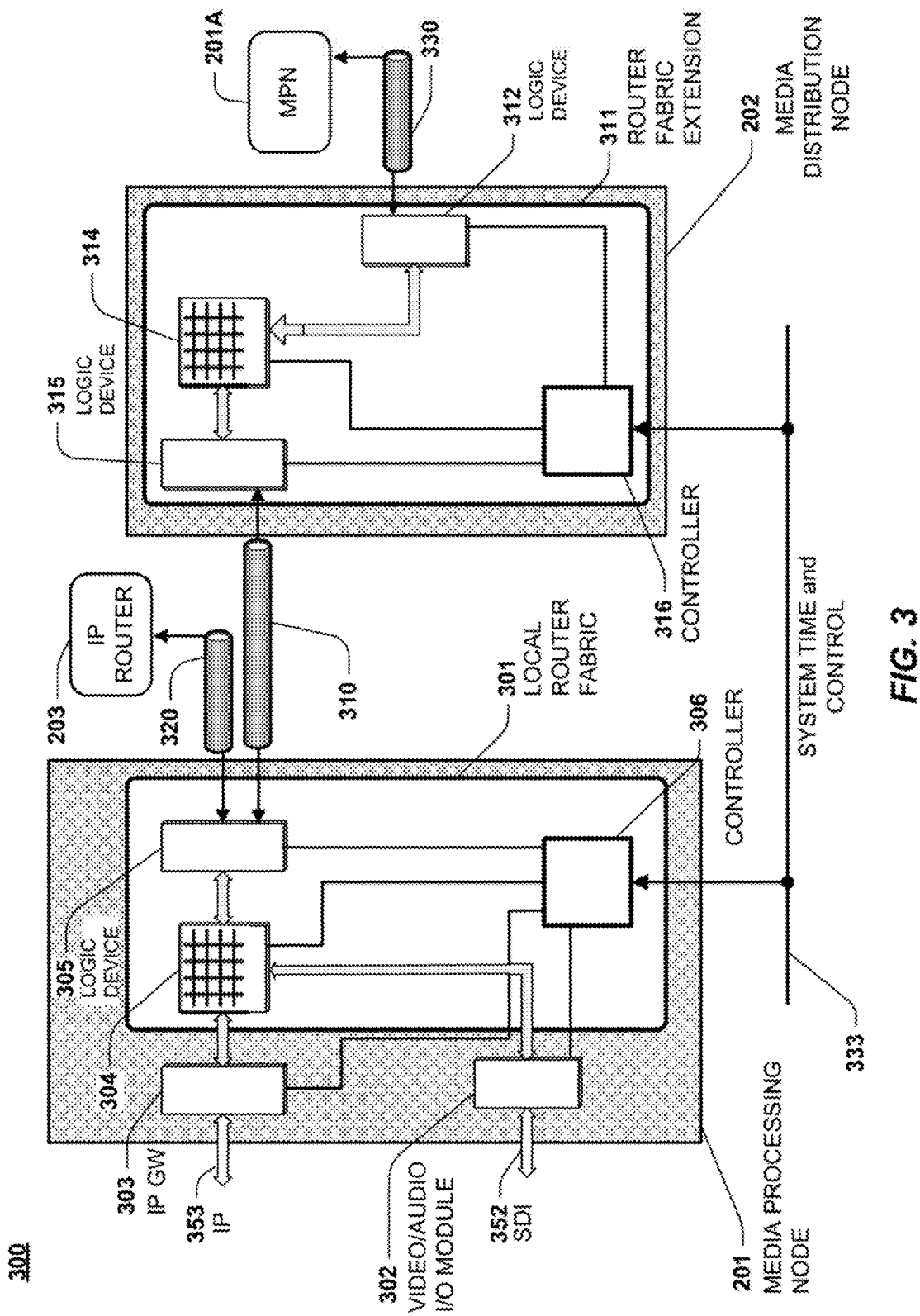
FIG. 3 shows an example media processing node and media distribution node in greater detail.

FIG. 3 shows an example media processing node 201 and media distribution node 202 in greater detail. The distribution of the router fabric 101 is shown as a local router fabric 301 in media processing node 201 and a router fabric extension 311 within the media distribution node 202. The local router fabric 301 may include a controller 306, crossbar switch 304, and at least one logic device 305. The media processing node 201 may also include an IP gateway 303, and a video input/output component 302. The router fabric extension 311 may include a controller 316, a logic device 315, a crossbar switch 314 and a logic device 312 for distribution to one or more media processing nodes (MPN) 201A on a respective trunk 330. In one example, an MPN may comprise a device such as a production switcher.

For example, when the media distribution node 202 includes multiple connections, e.g., 310 and 320, a logic device may be provided for each of the connections. Thus, logic device may be configured similarly to logic device 315. Logic device 315 may support a first connection between nodes, and logic device 312 may support a second connection between nodes. Although FIG. 3 illustrates media distribution node 202 as having only two logic devices 312, 315, media distribution node 202 may comprise more than two logic devices, each logic device supporting a separate connection between network nodes.

The logic device 305 of the local router fabric 301 and the logic device 315 of the router fabric extension 311 are coupled by a trunk 310, which allows the local router fabric 301 and the router fabric extension 311 to operate as a common fabric. For routing to the IP router 203, which operates in IP domain, a separate trunk 320 provides a path for the local router fabric 301 to route data out to the IP core via IP router 203. The logic device 305 may be configured to accommodate multiple trunks, each trunk to an IP router 203 or media distribution node 202. A plurality of logic devices 305 may be included in the local router fabric 301 to service additional trunks to other IP routers 203 and media distribution nodes 202. Alternatively, each logic device 305 may be configured to service one type of trunk. For example, a first logic device 305 may be configured to be coupled to several IP routers 203 each having a separate trunk, and a second logic device 305 may be configured to be coupled to a plurality of media distribution nodes 202, each having a separate trunk.

The controller 306 is configured to distribute the common system clock timing 333 to the IP gateway 303, the video input/output component 302, crossbar switch 304 and the logic device 305. The controller 306 may control the timing of routing for the packetized IP data 353 received from the IP gateway 303 and video input/output component 302.

The controller 306 may be further configured to receive information from a network controller necessary for a router fabric map, and based on that information, the controller 306 may assign the address for the router map and deliver the routing map, with the timing, to the logic device 305. The router fabric map may include an address for each packetized data input for directing the logic device 305 to the proper output location and the timing for the delivery of data. The address assigned by the controller 306 may be based on a trunk position of the destination. For example, a routing instruction to the logic device 305 may be to deliver a packetized data signal to the logic device 315 of the router fabric extension 311. In this instance, the address would be related to the trunk 310. As another example, if the routing destination is the IP router 203, which is external to the router fabric 101, then the address is based on the trunk 320, and the controller 306 may include additional information for special handling of the data leaving the local router fabric 301. The controller 306 may transmit this control information to the logic device relative to the system clock 333.

Accordingly, the order of the packetized data flow through the local router fabric 301 may be determined by the controller 306. Rather than having packetized data routing based on a random order, statistical order, or time varying order as would be the case in a typical IP router, the controller 306 manages and preserves the time domain as each packetized data signal moves through the router fabric 101. This enables glitch free switching from one channel to another channel during a real time broadcast since the data packets are maintained vertically aligned with the system clock frames of system time and control signal 333.

The controller 306 may control the local router fabric 301 as a state machine while running the packetized data through each element at a channel clock at least as fast as the common system clock. The controller 306 may delay the channel data until a switch command to the crossbar switch 304 is aligned to the system clock frame. The controller 306 may then feed the switch command to the crossbar switch 304, and at the next system clock pulse, the crossbar switch 304 is triggered to switch.

Further to the controller 306 maintaining routing with respect to the system clock frames, the controller 306 may also control channel timing at an oversampled data rate such that the packetized data signals move within the router fabric 101 faster than real time. Each channel may be oversampled at a data rate independently by the controller 306.

Figure 6:
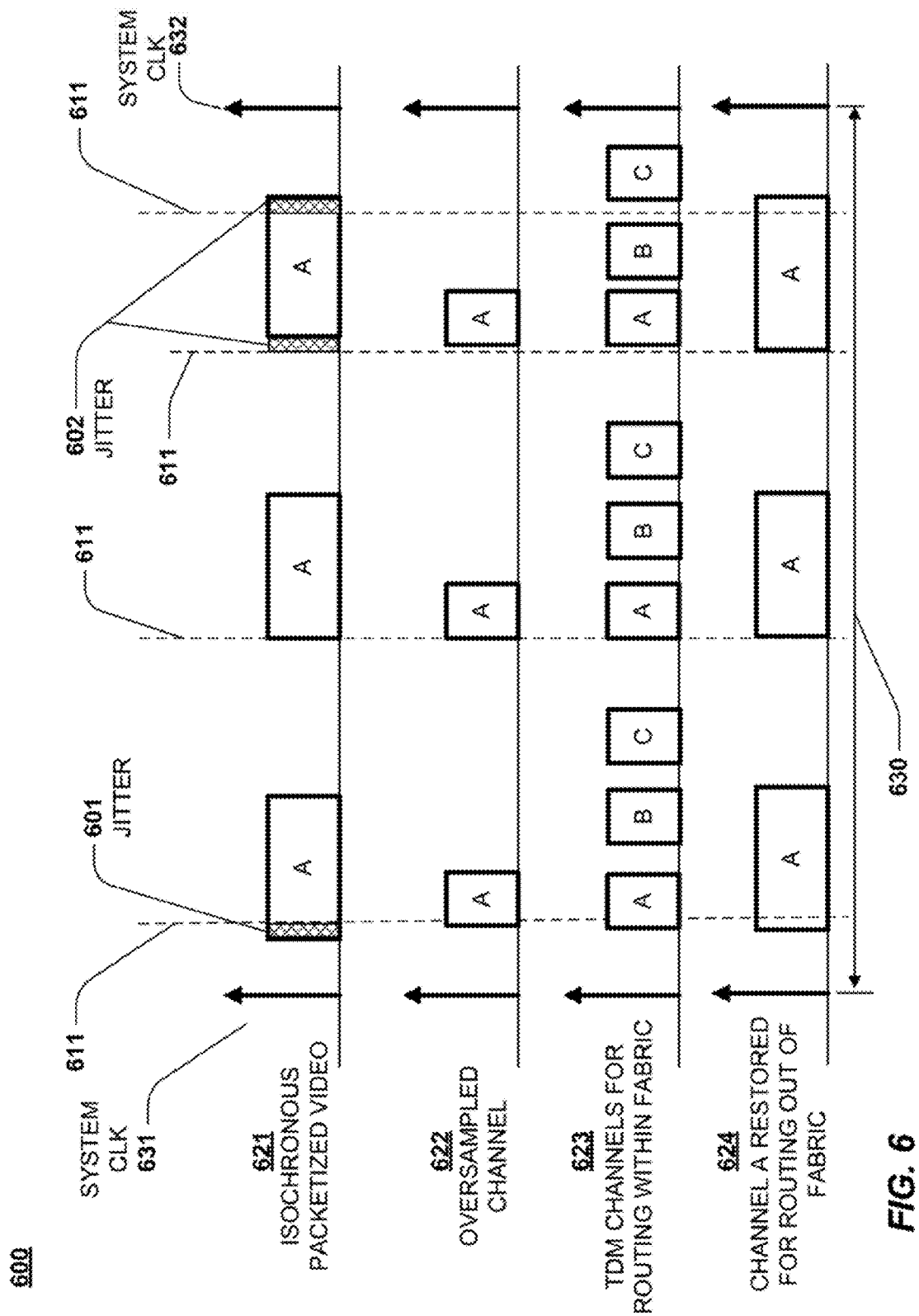
FIG. 6 shows an example time compression diagram illustrating the channel aggregation for transport of packetized data within the router fabric.

FIG. 6 shows an example timing diagram of a channel aggregation 600 for the packetized data routing within the router fabric 101. This example illustrates how ungroomed IP data received at the router fabric 101 may be processed seamlessly, such that the switching is "agnostic." Channel A arrives in the local router fabric 301 via IP gateway 303 as an isochronous input, as shown by regular intervals of the data packets with respect to the system clock frame 630. Because the packetized data of channel A was received at the IP gateway 303, the data in IP format may include some amount of jitter 601 and 602 on the pulse edges with respect to the jitter free pulse edge positions 611. Such jitter may be inherently present for IP data conforming to IP specifications. In contrast, data received in SDI format via component 302 is groomed, and substantially free of jitter. When channel A is switched to the logic device 305 from the crossbar switch 304, the controller 306 may instruct the logic device 305 to buffer the packetized data sampled at a first data rate for the input of the buffer, and then upsample the data at a second data rate for the output of the buffer, where the second data rate may be approximately three times greater than the first data rate. The oversampling may reduce jitter on channel A, as shown by the oversampled channel 622 in FIG. 6, and increase space on the system clock frame interval so that data packets of additional channels may be aggregated onto the trunk 310. The oversampling allows tolerance for jitter on the received packetized data on channel A, such that there is an ample gap between the data packets and the system clock frame markers 631 at the front of the frame and system clock frame marker 632 at the end of the system frame interval 630. TDM channels 623 shown for channel A, channel B and channel C packets, may be routed within the fabric 101. Channel B and channel C in this example have already been oversampled (not shown), and in this embodiment, each channel may be oversampled by the logic device 305 at an independent channel clock rate, which may differ from other channel clocks. The controller 306 maintains the independent channel clocks in addition to the system clock. The aggregation may be performed using time division multiplexing (TDM) and may include several more channels of data in addition to channels A, B and C. Channel A output data 624 is restored to the original sampling rate before leaving the local fabric 301 at IP gateway 303.

For packetized data routed to the video input/output component 302 as output, the video input/output component 302 may reduce the data rate back to original timing and clock smooth the signal before the packetized data leaves the media processing node 201. This permits the crossbar switch 304 and the logic device 305 of the local router fabric 301 to operate agnostic to the format required at the routing address destination.

Alternatively, in the case where the input source of video data uses inter frame compressed video formatting, such as MPEG, H.264, and AVC for example, the controller 306 may control the switching at the crossbar switch 304 based on the occurrence of an I-frame in the packetized data. The I-frame is encoded in various inter frame compressed video formats as a marker in the group of pictures (GOP), composed of I-frames, B-frames and P-frames. The router fabric 101 may be configured to communicate by an external interface to determine the particular sequence of I-frames, B-frames and P-frames. With this knowledge, the controller 306 may manage the switching to occur at the I-frame, and thereby avoid interference with the GOP interval between I frames caused by the switch.

The logic device 305 is arranged to interface with an upstream media distribution node 202 across trunk 310 to logic device 315 in the router fabric extension 311. The logic device 305 may aggregate the switched channels from the crossbar switch 304 for transmission to the router fabric extension 311. The logic device 305 may also route data to an IP router across trunk 320 if the media processing network is configured with an expansion to an IP core.

The logic device 305 receives the routing map and timing instructions from the controller 306 and provisions bandwidth for the data transport. The controller 306 distinguishes whether the routing is to the router fabric extension 311 (i.e., within the router fabric 101 as a whole) or to an IP router 203 (external to the router fabric) by controlling the channel clock for the logic device 305 as follows. For routing within the fabric, the packetized data may be oversampled at a rate that approaches the bandwidth capacity for the trunk 310. For example, if the trunk 310 is rated for a 40 GbE capacity, the oversampling for the channel may be up to about 90-95%, or 36-38 GbE. If, on the other hand, the packetized data is to be routed to an IP router 203 outside of the fabric 101, then the logic device 305 is configured to transmit the data at a lower level of bandwidth capacity suitable for the IP trunk 320 to avoid dropped packets by overloaded traffic at Ethernet ports in the IP domain. The control signal from the controller 306 includes routing map information and quality of service information to indicate which aggregation rate to apply. Hence the local router fabric 301 and router fabric extension 311 are capable of moving packetized data faster and at a higher efficiency than an IP router due in part to the routing and switching operations maintained by the controller 306 according to the common system clock timing.

The logic device 305 may be configured as an IP gateway to receive IP packets from the IP core via IP router 203 at an input port connection to the trunk 320. The IP packets can be sent to the cross bar switch 304 and switched to the IP gateway for direct output from the media processing node 201 based on timing from the controller 306.

Alternatively, there may be a separate logic device 305 coupled to the crossbar switch 304 and arranged to route data across the trunk 320 to and from the IP router 203 according to the same methods outlined above.

Figure 4:
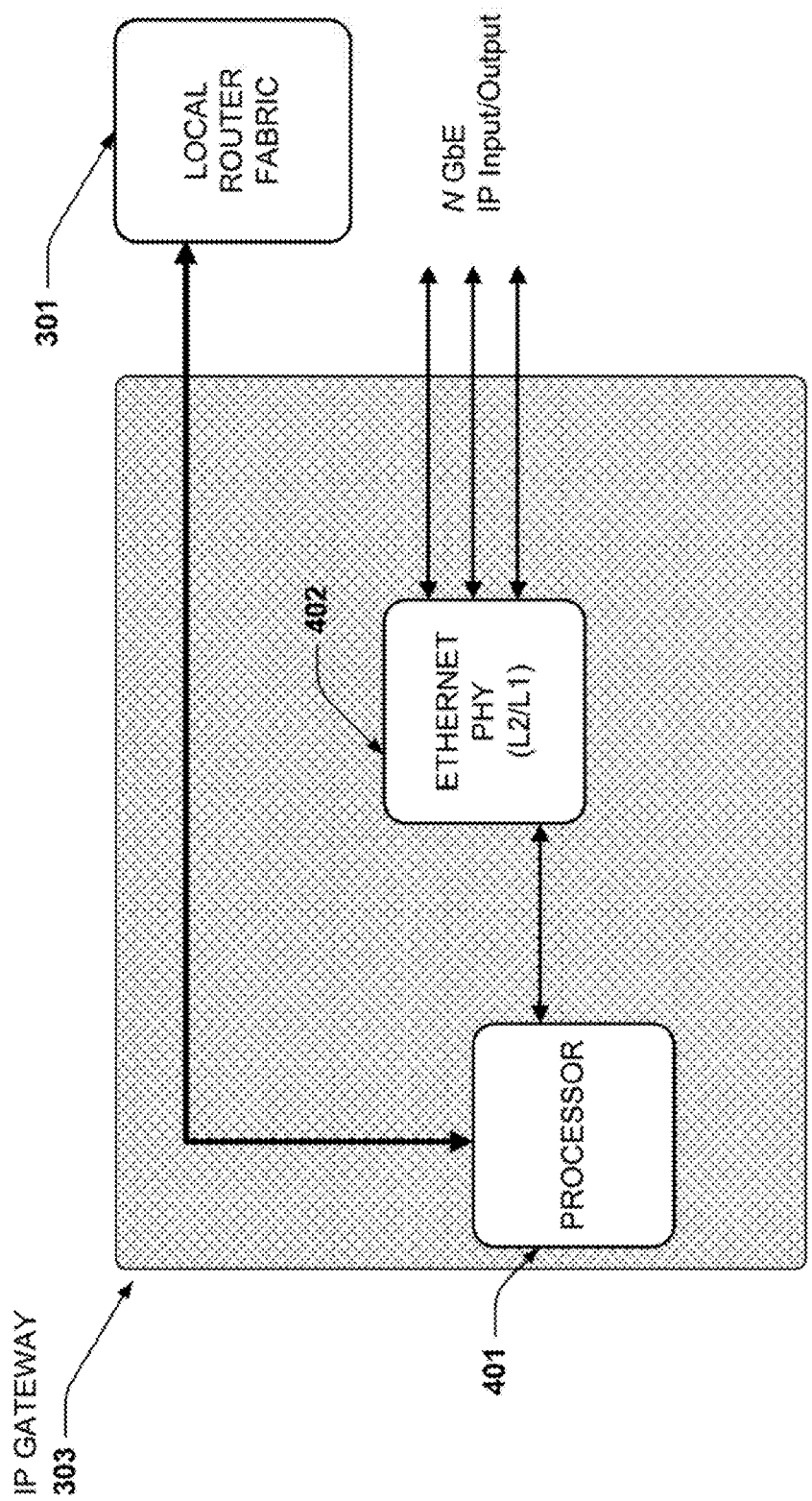
FIG. 4 shows an example IP gateway of the media processing node.

FIG. 4 shows an example block diagram of the IP gateway 303, which includes a processor 401 and an Ethernet PHY component 402. The IP data inputs are processed by the Ethernet PHY component 402 to translate the packetized data from L1 to L2 of the OSI stack model. The Ethernet PHY component 402 may also perform a demultiplexing of the bundled multiplexed video inputs, so that each video signal can be routed individually through the router fabric 101. The IP gateway 303 has input and output ports that may transport data at N GbE for video signals coming into and out of the media processing node 201. The ports may accept Ethernet connectors to and from devices such as shown in FIG. 1, where the packetized data may be transmitted according to any Ethernet specifications, such as 10 GbE for example. The gateway 303 receives system clock timing and control from the controller 306 which indicates routing addresses for input and output signals. The IP inputs may or may not be isochronous with respect to the system clock. If, for example, the input source is the camera 103, and the camera 103 has been set to operate isochronously with the system clock 333, then the processor 401 may simply unwrap the IP packetized data from the Ethernet frame, and send the packetized data to crossbar switch 304 in the local fabric 301.

Alternatively, the video source may not be synchronized to the system clock 333. In this case, the IP gateway 303 may analyze the input as follows. After unwrapping the IP packet from the Ethernet frame, the processor 401 may locate a video frame marker (e.g., a marker indicating data packet for line 1, pixel 1), and compare the data packet video frame interval unit to the system clock interval unit. Based on the comparison, the processor 401 may determine that the channel is isochronous even if there is a phase offset, so long as the data packets occur at regular intervals such that gaps between the payloads are aligned with system clock frame markers. This alignment allows the crossbar switch 304 to make a switch for the input channel to the logic device 305, without dropping any data packets since the packets remain intact within the system clock frame.

Once the packetized data is determined to be isochronous, the switching by crossbar switch 304 and routing by the logic device 305 may proceed while being format agnostic to the data. That is, once the packetized data from the IP gateway 303 is vertically aligned with the system clock, the local router fabric 301 may be controlled by the controller 306 according to the system clock timing regardless of whether the data input when arriving at the media processing node 201 is packetized compressed data, packetized IP, or packetized SDI. The aggregation of the channel data across the local router fabric 301 is packet based, and may be a time division multiplexing (TDM). The controller 306 may set the addresses for the data packet using direct memory address, keeps track of order of data packets. This allows the router fabric 101 to process the packetized signals without the IP overhead.

Alternatively, the processor 401 may determine that the input signal is not isochronous, in which case any of the following options are available. The IP gateway 303 can pass the packetized data intact to the crossbar switch 304, which may result in a glitch or a dropped packet at the switch point. The processor 401 may apply any of several known digital processing techniques to avoid a glitch, such as manipulating video content and/or audio content (e.g., throw away a frame, commonly called a frame synching) in order to create a blank interval at the switch point.

Figure 5:
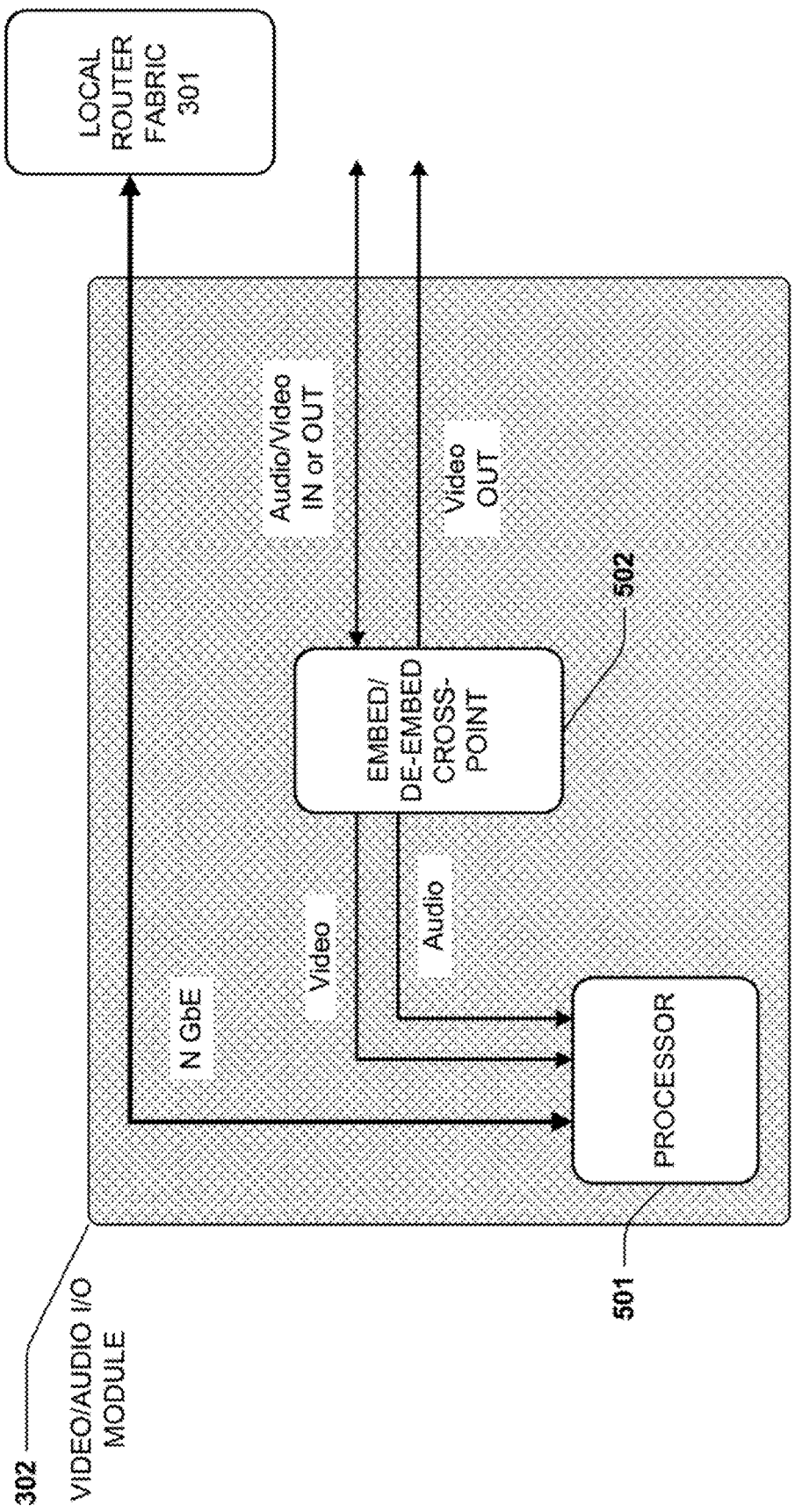
FIG. 5 shows an example video input/output component of the media processing node.

FIG. 5 shows an example block diagram of the audio/video component 302 which may include a processor 501 and an embed/de-embed cross point 502. Following some minor conditioning of the input video data, the processor receives the input video and converts the input video signal into a packetized data signal and sends it to the local router fabric 30. Routing in the opposite direction, from the local router fabric 301, to the video/audio I/O ports, the processor 501 may be configured to reduce the high sampling rate used in the fabric down to real time sampling rate.

Figure 7:
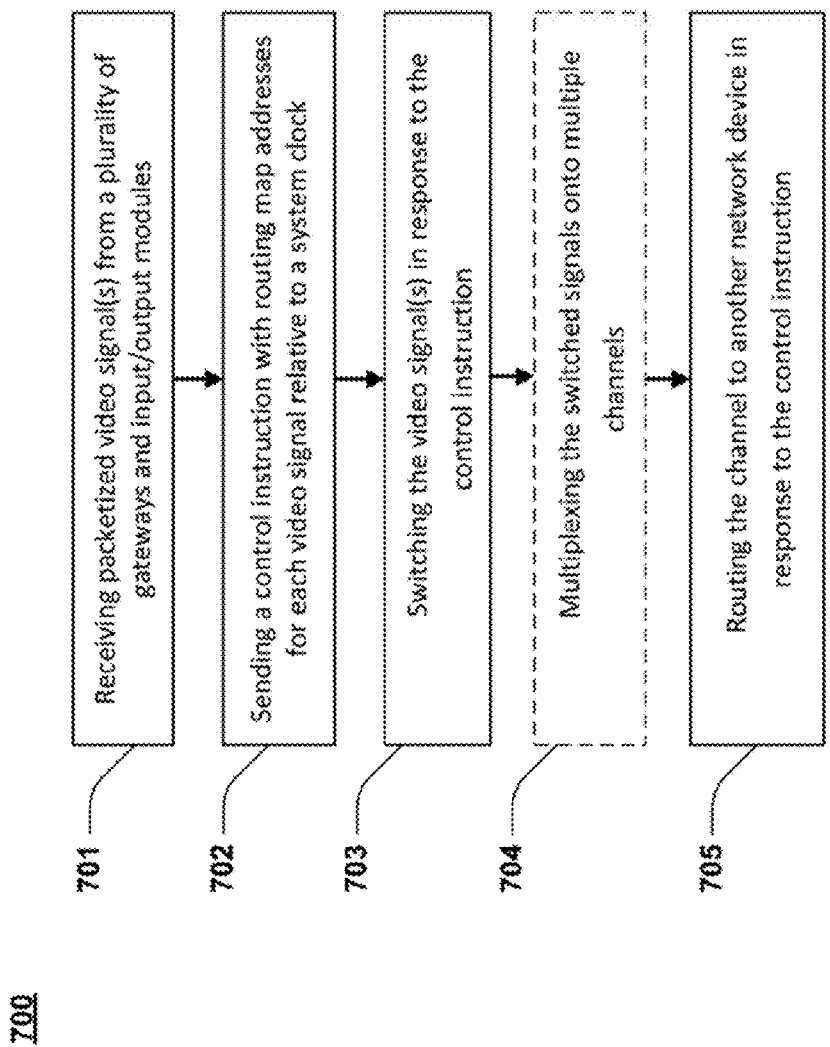
FIG. 7 shows a flowchart of an example method for routing and switching isochronous packetized data over the router fabric.

FIG. 7 shows an example flowchart of aspects of a method for switching real time broadcast video signals in a media processing network. In one example, the method may be performed at least in part by router fabric 101, e.g., as illustrated in connection with FIGS. 1-5.

At 701, isochronous packetized video signals are received from a plurality of gateways and input/output components. One example of a gateway is illustrated at 303 in FIG. 3. The received isochronous packetized video signals may comprise any of various video formats, including, e.g., serial digital video, packetized digital video, or packetized compressed video.

At 702, a control instruction is sent with routing map addresses for each video signal relative to a system clock. The control instructions may be sent, e.g., by controller 306, for an IP signal received at gateway 303. As described in connection with FIG. 3, the controller 306 may received information from a network controller such as a router fabric map. Based on that information, the controller 306 may assign the address for the router map and deliver the routing map, with timing to logic device 305 for delivery to a logic device, e.g., 315 of another node comprised in the router fabric 101.

At 703, the video signals are switched in response to the control instruction. Such switching may occur, e.g., via switch 304 for media processing node 201. Switching may also occur at switcher 314, in another example. As described in connection with FIG. 3, video signals may be switched in a manner that provides switching within a video frame time interval without a glitch. For example, for packetized video signals of different video formats, a switch may be performed for packetized data signals from all of the video sources at a mutual time point. The controller may be configured to determine the mutual time point.

At 704, the switched signals are routed to another network device in response to the control instruction. This may also include multiplexing the switched signals, e.g., onto multiple channels. For example, logic device 305 may aggregate the switched channels from switch 304 for transmission to another node comprised in the router fabric. Multiplexing multiple channels of data packets may be performed according to time division multiplexing, and may further include oversampling each channel at independent oversampling rates.

The routing of channels may comprise routing video data to a distribution node within the network or to an asynchronous IP router.

Logic device 305, e.g., may be configured to be coupled to a fabric extension node, wherein the controller is further configured to control the logic device to oversample data packets of the packetized video signals for transport to the fabric extension node. Thus, the method may comprise oversampling data packets of the packetized video signals.

When data is being transported to the distribution node, the method may further include provisioning bandwidth of a channel carrying the data at a first level of bandwidth capacity. When data routing is being transported to the asynchronous IP router, aspects may further include reprovisioning bandwidth of a channel carrying the data at a second level of bandwidth capacity less than the first level of bandwidth capacity. The first level of bandwidth capacity and the second level of bandwidth capacity may be related to an Ethernet frame rate.

The method may further include receiving IP packetized video data and determining whether the data packets are vertically aligned with time frames of the system clock. This aspect of the method may be performed, e.g., by a gateway such as 310 or 320. When the data packets are vertically aligned, the gateway may pass the packetized data to the crossbar switch for switching and routing within the fabric in an unaltered IP format. The method may include determining vertical alignment by unwrapping the IP packets, locating video frame markers, and comparing packet payload period to the system clock frame intervals. The method may include determining vertical alignment based on the relationship of the packet payload to system clock frames. For example, vertical alignment may be determined to be present when packet payload does not occur across two system clock frames. In another example, vertical alignment may be determined to be present when some phase offset between the payload period and system clock frame exists.

Aspects may further include receiving serial data video signals from video sources for input to the fabric router and sending output serial data video signals from the fabric router. The output may be received from the fabric as oversampled data packets and the video input/output component may be configured to reduce the sample rate to a data rate equal to the real time broadcast.

Although aspects have been described in connection with media processing node 201, aspects may further be accomplished via another node, such as media distribution node 202. The media distribution node 202 may communicate with the router fabric to deliver packetized video signals to another media processing node as well as to route channels of packetized video signals to another network device. Media processing node 201 similarly may include a switch 314 to switch video data of multiple channels between logic device 315 and I/O components in response to a control instruction. As well, controller 316 in media distribution node 202 may be configured to map routing addresses for each video signal relative to the system clock and to send the control instruction with the mapping to switch 314 and logic device 315.

By way of example and without limitation, the aspects of the present disclosure are presented with reference to systems and methods used to configure various components of a video production system that may be used for production of television programming or at sports events. The various concepts presented throughout this disclosure may be implemented across a broad variety of imaging applications, including systems that capture and process video and/or still images, video conferencing systems and so on.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A router fabric for switching real time broadcast video signals in a media processing network, comprising:
   a logic device configured to route multiple channels of packetized video signals to another network device;
   a crossbar switch configured to be coupled to a plurality of input/output components and to switch the packetized video signals between the logic device and the plurality of input/output components in response to a control instruction; and a controller configured to dynamically map routing addresses for each packetized video signal in an order relative to a system clock, and to send a system time and the control instruction with a mapped address to the crossbar switch and the logic device, wherein the router fabric is comprised in a media processing node that includes a gateway configured to receive IP packetized video data and to determine whether data packets of the IP packetized video data are vertically aligned with system clock frames of the system time, and wherein, when the gateway determines that the data packets are vertically aligned with the system clock frames, the gateway passes the IP packetized video data to the crossbar switch for switching and routing within the router fabric in an unaltered IP format.

2. The router fabric of claim 1, wherein the crossbar switch is further configured to switch the packetized video signals of different video formats, including at least two of baseband video, packetized digital video, or packetized compressed digital video.

3. The router fabric of claim 2, wherein the crossbar switch is further configured to switch within a video frame time interval without a glitch.

4. The router fabric of claim 2, wherein the crossbar switch is further configured to perform the switch of the packetized data signals from all video sources at a mutual time point.

5. The router fabric of claim 4, wherein the controller is further configured to determine the mutual time point using a time of day reference.

6. The router fabric of claim 1, wherein the logic device is configured to route the packetized video signals to a distribution node within the media processing network or to an asynchronous IP router.

7. The router fabric of claim 6, wherein
the logic device is configured to provision bandwidth of a channel carrying data at a first level of bandwidth capacity, when the data is being transported to the distribution node; and
the logic device is configured to reprovision bandwidth of a channel carrying the data at a second level of bandwidth capacity less than the first level of bandwidth capacity, when the data is being transported to the asynchronous IP router.

8. The router fabric of claim 7, wherein the first level of bandwidth capacity and second level of bandwidth capacity are related to an Ethernet frame rate.

9. The router fabric of claim 1, wherein the logic device is configured to be coupled to a fabric extension node, wherein the controller is further configured to control the logic device to oversample data packets of the packetized video signals for transport to the fabric extension node.

10. The router fabric of claim 9, wherein the logic device is further configured to multiplex multiple channels of data packets to a distribution node according to time division multiplexing, and to control independent oversampling rates by the logic device for each channel.

11. The router fabric of claim 1, wherein the gateway is configured to determine vertical alignment by unwrapping the data packets, locating video frame markers, and comparing packet payload period to system clock frame intervals of the system clock frames.

12. The router fabric of claim 1, wherein the gateway is configured to determine vertical alignment is present when each packet payload of each data packet does not occur across two system clock frames.

13. The router fabric of claim 12, wherein the gateway is configured to determine the vertical alignment is present when a phase offset exists between a payload period and a system clock frame.

14. The router fabric of claim 1, wherein the router fabric is comprised in a media processing node, the media processing node further comprising:
a video input/output component configured to receive serial data video signals from video sources for input to the fabric router and to send output serial data video signals from the fabric router, wherein the output is received from the fabric as oversampled data packets and the video input/output component is configured to reduce the sample rate to a data rate equal to a real time broadcast of the video signals.

15. A media processing network, comprising:
a media processing node including:
a first logic device configured to route multiple channels of packetized video signals to another network device;
a crossbar switch configured to be coupled to a plurality of input/output components and to switch the packetized video signals between the logic device and the plurality of input/output components in response to a control instruction; and
a controller configured to dynamically map routing addresses for each packetized video signal in an order relative to a system clock, and to send a system time and the control instruction with a mapped address to the crossbar switch and the logic device; and
a media distribution node, including:
a router fabric extension;
a second logic device configured to communicate with the router fabric extension and to deliver the packetized video signals to another media processing node;
a third logic device configured to route multiple channels of the packetized video signals to another network device;
a crossbar switch configured to be coupled to the second logic device and the third logic device to switch video data of the multiple channels between the logic device and the plurality of input/output component in response to a control instruction; and
a controller configured to map routing addresses for each video signal relative to the system clock, and to send the control instruction with the mapping to the crossbar switch and the logic device.

16. A method for switching real time broadcast video signals in a media processing network, comprising:
receiving IP packetized video signal by an IP gateway of a media processing node;
determining, by the IP gateway, whether data packets of the IP packetized video data are vertically aligned with system clock frames of a system that includes the media processing node;
passing the IP packetized video data in an unaltered IP format to a crossbar switch in the system when the IP gateway determines that the data packets are vertically aligned with the system clock frames; and
routing, by the crossbar switch, the IP packetized video data in the unaltered IP to another network device in response to a control instruction with a mapping routing address for the IP packetized video data.

17. The method of claim 16, wherein the received IP packetized video data are of various video formats, including at least two of serial digital video, packetized digital video, or packetized compressed video.

18. The method of claim 17, wherein the routing by the crossbar switch comprises routing the IP packetized video data to a distribution node within the media processing network or to an asynchronous IP router.

19. The method of claim 18, further comprising:
provisioning bandwidth of a channel carrying the IP packetized video data at a first level of bandwidth capacity, when the IP packetized video data is being transported to the distribution node; and
reprovisioning bandwidth of a channel carrying the IP packetized video data at a second level of bandwidth capacity less than the first level of bandwidth capacity, when the IP packetized video data is being transported to the asynchronous IP router.

20. A system for routing and glitch free switching of IP signals in a media processing network, the system comprising:
a controller configured to distribute system clock timing;
an IP gateway configured to receive at least one IP packetized video signal and determine whether data packets of the at least one IP packetized video signal are vertically aligned with system clock frames of the system clock timing; and
a router fabric configured to switch and route, through the media processing network based on the system clock timing, the data packets of the at least one IP packetized video signal in an unaltered IP format when the data packets are vertically aligned with system clock frames.

21. The system of claim 20,
wherein the controller is further configured to dynamically map routing addresses for the data packets of the at least one IP packetized video signal in an order relative to the system clock timing, and
wherein the router fabric includes a crossbar switch coupled to the IP gateway and configured to switch the at least one IP packetized video signal to a logic device based on the mapping routing addresses.

22. The system of claim 21, wherein the logic device is configured to route the at least one IP packetized video signal to one of a distribution node within the media processing network or to an asynchronous IP router.

23. The system of claim 22, wherein the logic device is configured to provision bandwidth of a channel carrying the at least one IP packetized video signal at a first level of bandwidth capacity when the at least one IP packetized video signal is routed to the distribution node, and the logic device is configured to reprovision bandwidth of a channel carrying the at least one IP packetized video signal at a second level of bandwidth capacity less than the first level of bandwidth capacity when the at least one IP packetized video signal is routed to the asynchronous IP router.

24. The system of claim 20, wherein the IP gateway is configured to determine whether the data packets are vertically aligned with the system clock frames by unwrapping the data packets of the at least one IP packetized video signal and comparing packet payload periods of the data packets to intervals of the system clock frames.

25. The system of claim 20, wherein the IP gateway is configured to determine whether the data packets are vertically aligned with the system clock frames when each packet payload of each respective data packet does not occur across two system clock frames.

26. The system of claim 20, wherein the IP gateway is configured to determine whether the data packets are vertically aligned with the system clock frames when the data packets occur at regular intervals such that respective gaps between each packet payload are aligned with respective markers of each system clock frame.

27. The system of claim 20, wherein the controller is a component of the router fabric.

28. The system of claim 20, wherein the at least one IP packetized video signal comprises at least one of packetized compressed data, packetized IP, and packetized SDI.

29. A media signal routing system for routing and glitch free switching of IP media data in a video media broadcast network, the system comprising:
an IP gateway configured to output data packets of a received IP packetized video signal in an unaltered IP format when the data packets are isochronous with a system clock of the media signal routing system; and
a router fabric configured to receive the data packets in the unaltered IP format from the IP gateway and route and switch without glitches the received IP packetized video signal for video broadcast to an output component of the media signal routing system based on the system clock.

30. The media signal routing system of claim 29, further comprising a controller configured to dynamically map routing addresses for the data packets of the IP packetized video signal in an order relative to the system clock.

31. The media signal routing system of claim 30, wherein the router fabric includes a crossbar switch coupled to the IP gateway and configured to glitch free switch the IP packetized video signal to a logic device based on the mapping routing addresses received from the controller.

32. The media signal routing system of claim 31, wherein the logic device is configured to route the packetized video signal to the output component that is one of a distribution node within the video media broadcast processing network or to an asynchronous IP router.

33. The media signal routing system of claim 32, wherein the logic device is configured to provision bandwidth of a channel carrying the IP packetized video signal at a first level of bandwidth capacity when the at least one IP packetized video signal is routed to the distribution node, and the logic device is configured to reprovision bandwidth of a channel carrying the IP packetized video signal at a second level of bandwidth capacity less than the first level of bandwidth capacity when the IP packetized video signal is routed to the asynchronous IP router.

34. The media signal routing of claim 30, wherein the controller is a component of the router fabric.

35. The media signal routing of claim 29, wherein the IP gateway is configured to determine whether the data packets are isochronous with the system clock by determining whether the data packets of the IP packetized video signal are vertically aligned with system clock frames of the system clock.

36. The media signal routing system of claim 35, wherein the IP gateway is configured to determine whether the data packets are vertically aligned with the system clock frames by unwrapping the data packets of the IP packetized video signal and comparing packet payload periods of the data packets to intervals of the system clock frames.

37. The media signal routing system of claim 35, wherein the IP gateway is configured to determine whether the data packets are vertically aligned with the system clock frames when each packet payload of each respective data packet does not occur across two system clock frames.

38. The media signal routing system of claim 35, wherein the IP gateway is configured to determine whether the data packets are vertically aligned with the system clock frames when the data packets occur at regular intervals such that respective gaps between each packet payload are aligned with respective markers of each system clock frame.

39. The media signal routing system of claim 29, wherein the IP packetized video signal comprises one of packetized compressed data, packetized IP, and packetized SDI.

* * * * *